United States Patent
Liu et al.

(10) Patent No.: US 11,316,784 B2
(45) Date of Patent: Apr. 26, 2022

(54) METHOD AND DEVICE FOR PROCESSING PACKET BY USING UNIFIED SR LABEL STACK

(71) Applicant: ZTE CORPORATION, Guangdong (CN)

(72) Inventors: Aihua Liu, Guangdong (CN); Shuangping Zhan, Guangdong (CN); Fangwei Hu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/971,075

(22) PCT Filed: Feb. 12, 2019

(86) PCT No.: PCT/CN2019/074875
§ 371 (c)(1),
(2) Date: Aug. 19, 2020

(87) PCT Pub. No.: WO2019/165888
PCT Pub. Date: Sep. 6, 2019

(65) Prior Publication Data
US 2021/0099382 A1 Apr. 1, 2021

(30) Foreign Application Priority Data
Mar. 1, 2018 (CN) .......................... 201810171541.9

(51) Int. Cl.
*H04L 12/723* (2013.01)
*H04L 29/12* (2006.01)
(Continued)

(52) U.S. Cl.
CPC ............ *H04L 45/50* (2013.01); *H04L 47/125* (2013.01); *H04L 61/6086* (2013.01); *H04L 69/22* (2013.01); *H04W 24/08* (2013.01)

(58) Field of Classification Search
None
See application file for complete search history.

(56) References Cited

U.S. PATENT DOCUMENTS

| 2015/0256456 A1 | 9/2015 | Previdi et al. |
| 2015/0263940 A1* | 9/2015 | Kini ........................ H04L 45/50 370/236.2 |

(Continued)

OTHER PUBLICATIONS

S. Bryant, A. Farrel, J. Tantsura, MPLS Segment Routing in IP Networks, pp. 1-18, (Oct. 30, 2017).*
(Continued)

*Primary Examiner* — Christopher M Crutchfield
(74) *Attorney, Agent, or Firm* — Li & Cai Intellectual Property (USA) Office (57) ABSTRACT

A method and a device for processing a packet by using a unified SR label stack, relating to the field of PTN. The method includes: allocating, according to a type of a forwarding plane, a compatibility indicator indicating that a unified U-SRH is carried, for a service packet entering the forwarding plane; adding an SR label stack, the U-SRH and the compatibility indicator to the service packet to obtain an extended packet; and processing and forwarding the extended packet in the forwarding plane according to the SR label stack, the U-SRH and the compatibility indicator. According to embodiments of the present disclosure, the unified SR label stack is used to simplify an application of SR technology in different forwarding planes, and uniformity of SR encapsulation format is enhanced.

10 Claims, 3 Drawing Sheets

(51) Int. Cl.
    *H04L 29/06*     (2006.01)
    *H04L 12/803*     (2013.01)
    *H04W 24/08*     (2009.01)
    *H04L 45/50*     (2022.01)
    *H04L 101/686*     (2022.01)
    *H04L 69/22*     (2022.01)
    *H04L 47/125*     (2022.01)

(56) References Cited

U.S. PATENT DOCUMENTS

2020/0358698 A1* 11/2020 Song ............... H04L 69/22
2021/0135986 A1* 5/2021 Song ............... H04L 45/304

OTHER PUBLICATIONS

S. Previdi, Ed., J. Leddy, B. Field, D. Voyer, D. Bernier, S. Matsushima, I. Leung, J. Linkova, E. Aries, T. Kosugi, E. Vyncke, D. Lebrun, D. Steinberg and R. Raszuk, IPv6 Segment Routing Header (SRH), pp. 1-34, (Jul. 20, 2017).*
C. Filsfils, N. Nainar, C. Pignataro, J. Cardona, P. Francois, The Segment Routing Architecture, pp. 1-6 (Year: 2015).*
S. Previdi, Ed., S. Litkowski, M. Horneffer, R. Shakir, Source Packet Routing in Networking (SPRING) Problem Statement and Requirements, pp. 1-19 (Year: 2016).*
European Patent Office, Extended European Search Report dated Sep. 24, 2021 regarding EP19759928.5.
Japan Patent Office, First Office Action dated Sep. 28, 2021 regarding JP2020-544421.
Bryant S., et al. "MPLS Segment Routing in TP Networks draft-bryant-mpls-unified-ip-sr-03", Internet-Draft, MPLS Working Group, IETF, issued on Oct. 30, 2017.

* cited by examiner

METHOD AND DEVICE FOR PROCESSING PACKET BY USING UNIFIED SR LABEL STACK

TECHNICAL FIELD

The present disclosure relates to the field of Packet Transport Network (PTN), and in particular, to a method and a device for processing a packet by using a unified Segment Routing (SR) label stack.

BACKGROUND

SR is a method for routing based on a source address, and by carrying a Segment Routing Header (SRH) in a packet header of existing Multi-Protocol Label Switching (MPLS) network or Internet Protocol version 6 (IPv6), a series of indication operations (also called segment operations) are carried in the SRH for routing and transmitting data in a network. Through segment routing, load balance and flow engineering of the network can be conveniently realized, complex network functions such as quick rerouting and the like can be realized, and the indication of the segment operations can also be extended to realize a routing indication based on service or topology.

Figure 1:
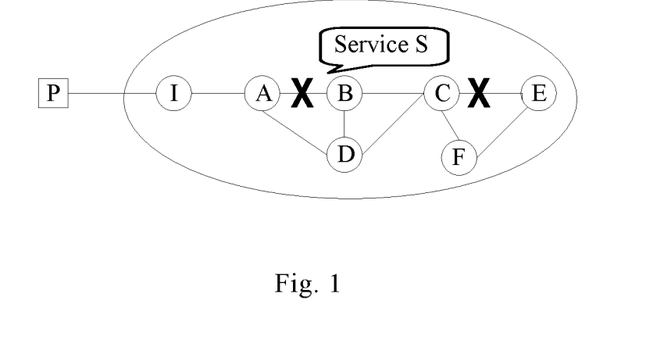
FIG. 1 is a schematic diagram illustrating a principle of SR technology.

FIG. 1 shows a schematic diagram illustrating a technical principle of segment routing, as shown in FIG. 1, I indicates an ingress node responsible for encapsulating a segment routing format of a packet P, E indicates an egress node responsible for decapsulating a segment routing packet, and A, B, C, D and F indicate intermediate forwarding nodes responsible for data forwarding of the segment routing packet. The shortest path from node I to node E in FIG. 1 is I-A-B-C-E, while a user requires that the packet would pass through node B but not through links between A and B and between C and E when it is forwarded. Under such circumstance, conventional calculation methods based on the shortest path cannot meet user's requirement, and thus a segment routing technology is proposed in the art. Indications of a path to be passed is encapsulated in the SR header at the ingress node I, an intermediate router forwards data according to the indications, and identifiers of the indications are advertised through Interior Gateway Protocol (IGP). There is no need of a traditional way using a signaling protocol for advertising, and an intermediate node does not need to maintain forwarding information of flow engineering, resulting in a simplified network deployment.

In current SR technology, there are different routing instruction Label Stacks for different forwarding planes, that is, the SR adopts a label stack (I-D.ietf-spring-segment-routing-mpls) compatibility with an MPLS label format for an MPLS forwarding plane, adopts a label stack (I-D.ietf-6man-segment-routing-header) compatibility with an IPv6 address format through a Segment Routing Extension Header (SRH) for an IPv6 forwarding plane, and adapt corresponding label stack formats for other forwarding planes. Such design introduces following problems for processing of SR label stack.

Problem 1, the SR needs to adapt different label stack formats for different forwarding planes, the label stack formats are not unified, and especially in a scenario where a service end-to-end forwarding path spans different forwarding planes, a forwarding boundary node needs to translate the label stack format to adapt to the forwarding plane.

Problem 2, an application of the SR needs to sense a specific forwarding plane technology, different label stack formats are adaptively encapsulated for different forwarding planes, and a complexity of the application of the SR is increased.

Problem 3, the SR adapts the label stack formats for different forwarding planes, which is not conducive to the SR technology extending to a new forwarding plane, i.e., a new SR label stack format needs to be specially defined for the new forwarding plane.

SUMMARY

A method and a device for processing a packet by using a unified SR label stack are provided by embodiments of the preset disclosure to solve the problem that different label stack encapsulation formats need to be adapted for different forwarding planes when the packet is forwarded by current SR.

In an embodiment of the present disclosure, provided is a method for processing a packet by using a unified SR label stack including: allocating, according to a type of a forwarding plane, a compatibility indicator indicating that a Unified Segment Routing Header (U-SRH) is carried, for a service packet entering the forwarding plane; adding an SR label stack, the U-SRH and the compatibility indicator to the service packet to obtain an extended packet; and processing and forwarding the extended packet in the forwarding plane according to the SR label stack, the U-SRH and the compatibility indicator.

In some implementations, the allocating, according to the type of the forwarding plane, the compatibility indicator indicating that the U-SRH is carried, for the service packet entering the forwarding plane includes: in response to that the forwarding plane is a Multi-Protocol Label Switching (MPLS) or Multi-Protocol Label Switching Transport Protocol (MPLS-TP) forwarding plane, allocating an MPLS or MPLS-TP reserved label indicating that the U-SRH is carried, for the service packet as the compatibility indicator; in response to that the forwarding plane is an IPv6 forwarding plane, allocating an IPv6 extension header indicating that the U-SRH is carried, for the service packet as the compatibility indicator; in response to that the forwarding plane is an IPv4 forwarding plane, allocating a User Data Protocol (UDP) port number indicating that the U-SRH is carried, for the service packet as the compatibility indicator; and in response to that the forwarding plane is any other forwarding plane, allocating an extended header indicating that the U-SRH is carried, for the service packet as the compatibility indicator.

In some implementations, the U-SRH includes a parameter indicating a format of the SR label stack, and the parameter includes at least one of a header version, a maximum label number and a current label number of the label stack, a maximum label depth and a current label depth, a format width of a SR label, a forwarding plane encapsulation type, and other flags.

In some implementations, the adding the SR label stack, the U-SRH and the compatibility indicator to the service packet to obtain the extended packet includes: pushing the SR label stack and the U-SRH into the service packet in a stack pushing mode, and pushing the compatibility indicator before the U-SRH, to obtain the extended packet.

In some implementations, the processing and forwarding the extended packet in the forwarding plane according to the SR label stack, the U-SRH and the compatibility indicator includes: in response to identifying, by parsing the extended packet, that the extended packet carries the compatibility indicator and the compatibility indicator is identified as indicating a compatibility forwarding plane, processing and forwarding the extended packet according to the U-SRH and the compatibility indicator; in response to that no compatibility indicator is identified as being carried by the extended packet, forwarding the extended packet according to a forwarding flow of the forwarding plane; and in response to that the compatibility indicator is not identified as indicating the compatibility forwarding plane, discarding the extended packet.

In some implementations, the method further includes: in response to that the extended packet is forwarded to an egress of the forwarding plane, popping up the U-SRH, the SR label stack and the compatibility indicator from the extended packet, and sending the service packet out of the forwarding plane.

In an embodiment of the present disclosure, provided is a device for processing a packet by using a unified SR label stack including: an allocating module configured to allocate, according to a type of a forwarding plane, a compatibility indicator indicating that a U-SRH is carried, for a service packet entering the forwarding plane; a stack pushing module configured to add an SR label stack, the U-SRH and the compatibility indicator to the service packet to obtain an extended packet; and a forwarding module configured to process and forward the extended packet in the forwarding plane according to the SR label stack, the U-SRH and the compatibility indicator.

In another embodiment of the present disclosure, provided is a device for processing a packet by using a unified SR label stack including: a processor and a memory coupled to the processor, the memory stores a program, capable of being executed by the processor, for processing the packet by using the unified SR label stack, and the program is to be executed by the processor to implement following steps: allocating, according to a type of a forwarding plane, a compatibility indicator indicating that a U-SRH is carried, for a service packet entering the forwarding plane; adding an SR label stack, the U-SRH and the compatibility indicator to the service packet to obtain an extended packet; and processing and forwarding the extended packet in the forwarding plane according to the SR label stack, the U-SRH and the compatibility indicator.

In an embodiment of the present disclosure, provided is a system for processing a packet by using a unified SR label stack including: an ingress node configured to allocate, according to a type of a forwarding plane, a compatibility indicator indicating that a U-SRH is carried, for a service packet entering the forwarding plane, and add an SR label stack, the U-SRH and the compatibility indicator to the service packet to obtain an extended packet; a forwarding node configured to determine whether the extended packet carries the U-SRH according to the compatibility indicator carried by the extended packet, and process and forward the extended packet according to the U-SRH and the SR label stack; and an egress node configured to pop up the U-SRH, the SR label stack and the compatibility indicator from the extended packet, and send the service packet out of the forwarding plane.

In an embodiment of the present disclosure, provided is a storage medium storing a program for processing a packet by using a unified SR label stack, and the program is to be executed by a processor to implement following steps: allocating, according to a type of a forwarding plane, a compatibility indicator indicating that a U-SRH is carried, for a service packet entering the forwarding plane; adding an SR label stack, the U-SRH and the compatibility indicator to the service packet to obtain an extended packet; and processing and forwarding the extended packet in the forwarding plane according to the SR label stack, the U-SRH and the compatibility indicator.

Technical solutions provided by the embodiments of the present disclosure have following beneficial effects.

The embodiments of the present disclosure realize the unified SR label stack in a PTN, and specifically applies the unified SR label stack to different forwarding planes, thereby improving uniformity, effectiveness and expansibility of the SR technology, and being suitable for various packet forwarding networks including MPLS/MPLS-TP, IPv4/IPv6 and the like.

DESCRIPTION OF EMBODIMENTS

The embodiments of the present disclosure will be described in detail below with reference to the accompanying drawings, and it should be understood that the embodiments described below are only for a purpose of illustrating and explaining the present disclosure, and are not to be used as limitations of the present disclosure.

Embodiment 1

Figure 2:
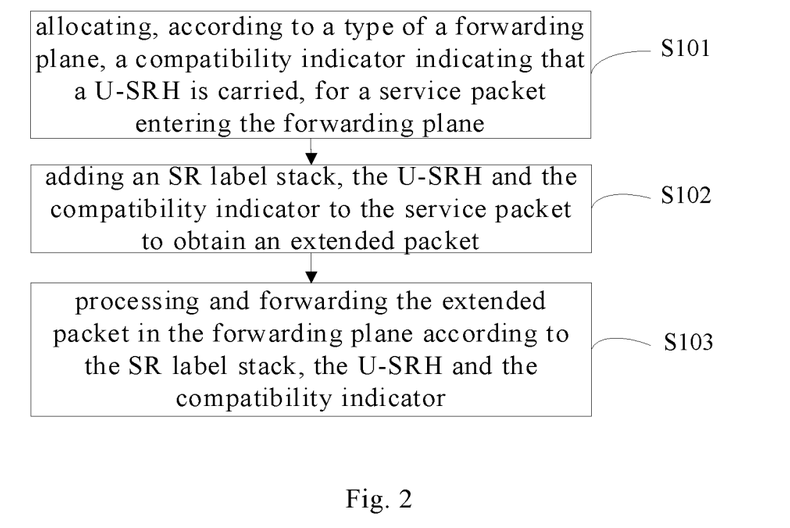
FIG. 2 is a flowchart for processing a packet by using a unified SR label stack according to an embodiment of the present disclosure.

FIG. 2 is a flowchart of processing a packet by using a unified SR label stack according to the embodiment of the present disclosure, and as shown in FIG. 2, following steps S101 to S103 are included.

At step S101, allocating, according to a type of a forwarding plane, a compatibility indicator indicating that a Unified Segment Routing Header (U-SRH) is carried, for a service packet entering the forwarding plane.

If the forwarding plane is an MPLS or MPLS-TP forwarding plane, an MPLS or MPLS-TP reserved label indicating that the U-SRH is carried, for example, with a reserved label value of 8, is allocated for the service packet as the compatibility indicator. If the forwarding plane is an IPv6 forwarding plane, an IPv6 extension header, for example, an extension header 45 indicating that the U-SRH is carried, is allocated for the service packet as the compatibility indicator. If the forwarding plane is an IPv4 forwarding plane, a UDP port number, such as a UDP port number 2000 indicating that the U-SRH is carried, is allocated for the service packet as the compatibility indicator. If the forwarding plane is any other forwarding plane, for example, a Virtual extensible Local Area Network (VxLAN) forwarding plane, an extension header indicating that the U-SRH is carried, is allocated for the service packet as the compatibility indicator, and the extension header may be a newly defined extension header or a newly defined routing extension header based on the SRH.

At step S102, adding an SR label stack, the U-SRH and the compatibility indicator to the service packet to obtain an extended packet.

The SR label stack and the U-SRH are pushed into the service packet in a stack pushing mode, and then the compatibility indicator is pushed before the U-SRH, to obtain the extended packet.

At step S103, processing and forwarding the extended packet in the forwarding plane according to the SR label stack, the U-SRH and the compatibility indicator.

If it is identified that the extended packet carries the compatibility indicator by parsing the extended packet, and the compatibility indicator is identified as indicating a compatibility forwarding plane, the extended packet is processed and forwarded according to the U-SRH and the compatibility indicator, and if the compatibility indicator is not identified as indicating the compatibility forwarding plane, the extended packet is discarded.

It should be noted that, if no compatibility indicator is identified as being carried by the extended packet, the extended packet is forwarded according to a forwarding flow of the forwarding plane.

The U-SRH contains a parameter for indicating a format of the SR label stack, and the parameter includes at least one of a header version, a maximum label number and a current label number of the label stack, a maximum label depth and a current label depth, a format width of a SR label, a forwarding plane encapsulation type, and other flags. The other flags may include information such as an Operation Administration and Maintenance (OAM) packet indication.

Further, when the extended packet is forwarded to an egress of the forwarding plane, the U-SRH, the SR label stack, and the compatibility indicator are popped up from the extended packet, and the service packet is sent out of the forwarding plane.

It will be understood by those skilled in the art that all or a part of steps in the method according to the above embodiments may be implemented by a program instructing a related hardware, and the program may be stored in a computer-readable storage medium. An embodiment of the present disclosure may provide a storage medium, which stores a program for processing a packet by using a unified SR label stack, and the program is to be executed by a processor to implement following steps: allocating, according to a type of a forwarding plane, a compatibility indicator indicating that a U-SRH is carried, for a service packet entering the forwarding plane; adding an SR label stack, the U-SRH and the compatibility indicator to the service packet to obtain an extended packet; and processing and forwarding the extended packet in the forwarding plane according to the SR label stack, the U-SRH and the compatibility indicator. The storage medium may include ROM/RAM, magnetic disk, optical disk and U disk.

Embodiment 2

Figure 3:
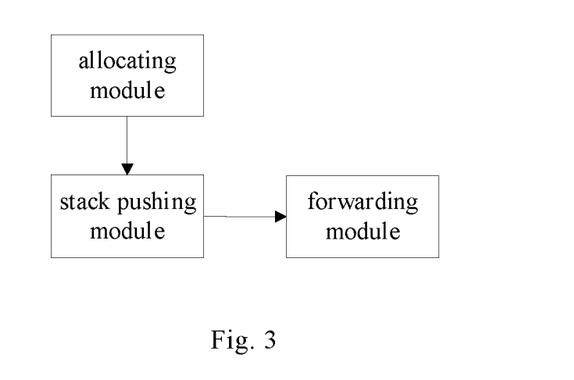
FIG. 3 is a block diagram of a device for processing a packet by using a unified SR label stack according to an embodiment of the present disclosure.

FIG. 3 is a block diagram of a device for processing a packet by using a unified SR label stack according to an embodiment of the present disclosure, and as shown in FIG. 3, the device includes: an allocating module configured to allocate, according to a type of a forwarding plane, a compatibility indicator indicating that a U-SRH is carried, for a service packet entering the forwarding plane; a stack pushing module configured to add an SR label stack, the U-SRH and the compatibility indicator to the service packet to obtain an extended packet; and a forwarding module, configured to process and forward the extended packet in the forwarding plane according to the SR label stack, the U-SRH and the compatibility indicator.

The device may be arranged at an ingress node of the forwarding plane, and a work flow of the device is as follows: if the forwarding plane is an MPLS or MPLS-TP forwarding plane, the allocating module allocates an MPLS or MPLS-TP reserved label indicating that the U-SRH is carried, for example, with a reserved label value of 8, for the service packet, as the compatibility indicator; if the forwarding plane is an IPv6 forwarding plane, the allocating module allocates an IPv6 extension header, for example, an extension header 45 indicating that the U-SRH is carried, for the service packet, as the compatibility indicator; if the forwarding plane is an IPv4 forwarding plane, the allocating module allocates a UDP port number, such as a UDP port number 2000 indicating that the U-SRH is carried, for the service packet, as the compatibility indicator; if the forwarding plane is any other forwarding plane, such as a VxLAN forwarding plane, the allocating module allocates an extension header indicating that the U-SRH is carried, for the service packet, as the compatibility indicator. The stack pushing module pushes the SR label stack and the U-SRH into the service packet in a stack pushing mode, and then pushes the compatibility indicator before the U-SRH, to obtain the extended packet. The forwarding module processes and forwards the extended packet according to the U-SRH and the compatibility indicator.

The forwarding module may be arranged at a forwarding node and an egress node, and when the forwarding node receives a packet, the forwarding module parses the extended packet, and in response to identifying that the extended packet carries the compatibility indicator and the compatibility indicator is identified as indicating a compatibility forwarding plane, processes and forwards the extended packet, and in response to identifying that the extended packet carries the compatibility indicator while the compatibility indicator is not identified as indicating the compatibility forwarding plane, discards the extension packet. When the egress node receives the extended packet, the U-SRH, the SR label stack and the compatibility indicator are popped up from the extended packet, and the service packet is sent out of the forwarding plane.

Embodiment 3

The present embodiment provides a device for processing a packet by using a unified SR label stack, which includes: a processor and a memory coupled to the processor, the memory stores a program, capable of being executed by the processor, for processing a packet by using a unified SR label stack, and the program is to be executed by the processor to implement following steps: allocating, according to a type of a forwarding plane, a compatibility indicator indicating that a U-SRH is carried, for a service packet entering the forwarding plane; adding an SR label stack, the U-SRH and the compatibility indicator to the service packet to obtain an extended packet; and processing and forwarding the extended packet in the forwarding plane according to the SR label stack, the U-SRH and the compatibility indicator.

Embodiment 4

The present embodiment provides a system for processing a packet by using a unified SR label stack, which includes: an ingress node configured to allocate, according to a type of a forwarding plane, a compatibility indicator indicating that a U-SRH is carried, for a service packet entering the forwarding plane, and add an SR label stack, the U-SRH and the compatibility indicator to the service packet to obtain an extended packet; a forwarding node configured to determine whether the extended packet carries the U-SRH according to the compatibility indicator carried by the extended packet, and process and forward the extended packet according to the U-SRH and the SR label stack; and an egress node configured to pop up the U-SRH, the SR label stack and the compatibility indicator from the extended packet, and send the service packet out of the forwarding plane.

A working process of the system is as follows: after receiving the service packet, the egress node pushes an SR label stack and the U-SRH into the service packet, and pushes the compatibility indicator allocated for the service packet before the U-SRH to obtain the extended packet, so as to process and forward the packet. After the forwarding node receives the extended packet, in response to identifying that the extended packet carries the compatibility indicator and the compatibility indicator is identified as indicating a compatibility forwarding plane, the extended packet is processed and forwarded. The egress node pops up the U-SRH, the SR label stack and the compatibility indicator from the extended packet and sends the service packet out of the forwarding plane.

Embodiment 5

The embodiments of the present disclosure realize a unified SR label stack format in a packet transport network, do not need the SR to adapt different label stacks for different forwarding planes, and the unified SR label stack can adapt to different forwarding planes. That is to say, the embodiments of the present disclosure design a unified SR label stack format, and with the unified SR label stack format, it is not necessary to adapt different label stacks for different forwarding planes, and the unified SR label stack is applied to different forwarding planes.

Figure 4:
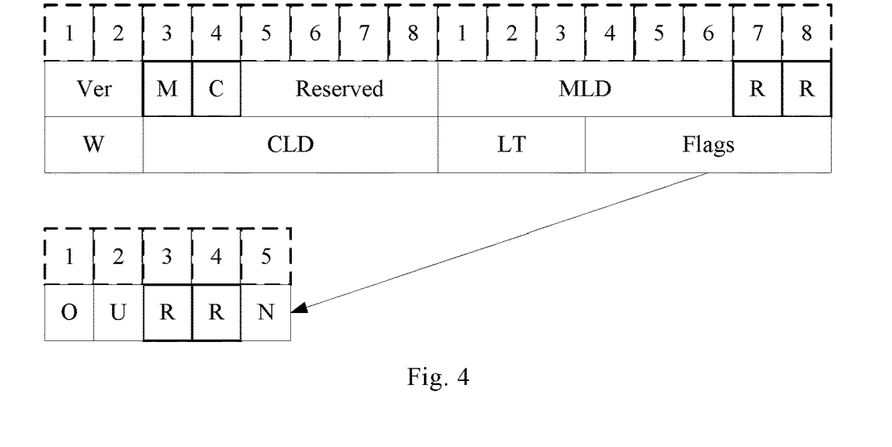
FIG. 4 is a schematic diagram illustrating a definition of format of a Unified Segment Routing Header (U-SRH) in an embodiment of the present disclosure.

FIG. 4 is a schematic diagram illustrating a definition of format of a U-SRH in an embodiment of the present disclosure. As shown in FIG. 4, a Unified Segment Routing Header (U-SRH) is added, where relevant parameters of the SR label stack format, such as version number (Version, Ver or V) of the label stack, maximum label number (Max Label Num, MLN or M) of the label stack, current label number (Current Label Num, CLN or C) of the label stack, encapsulation type (Label Type, LT) of a label, and other flags (Flags, F) are defined in the SR header, and with the U-SRH, it is convenient to realize the unified SR label stack without perceiving technologies of different forwarding planes.

An algorithm provided by the embodiments of the present disclosure includes following steps 1 and 2.

Step 1, defining a U-SRH, where the header contains a parameter indicating a format of SR label stack, and a unified SR label stack format is shown in FIG. 4.

Step 2, defining a compatibility indicator of the U-SRH, which is compatible with an existing forwarding plane. For an MPLS/MPLS-TP forwarding plane, an MPLS reserved label value (e.g., a reserved value of 8 is suggested for the MPLS/MPLS-TP forwarding plane identifying an indicator indicating whether an SR label stack is carried or not) may be used, but is not limited, for an extension indication of the U-SRH. For an IPv6 forwarding plane, a new Extension Header Type may be defined or a new routing extension header type may be defined based on the SRH for indicating whether the SR label stack is carried or not. For any other forwarding plane such as VxLAN, a U-SRH indicator may be defined by similar considerations.

The U-SRH in the step 1 may include, but is not limited to, a version (Ver, such as 2 bits) parameter indicating a version of the header and supports subsequent update and extension of the U-SRH.

The U-SRH in the step 1 may include, but is not limited to, a Label Depth (LD, such as 6 bits) parameter, including a required Maximum Label Depth (MLD) and a Current Label Depth (CLD), so as to facilitate the forwarding plane processing the label stack.

The U-SRH in the step 1 may include, but is not limited to, a format width (W, such as 2 bits) parameter of a SR label, indicating a bit width (e.g., 0:32 bits/1:128 bits) of the label.

The U-SRH in the step 1 may include, but is not limited to, an encapsulation type (LT, such as 3 bits) parameter of the forwarding plane, indicating an encapsulation protocol format of the label, a flexible label encapsulation type is supported, and an MPLS label type (e.g., 0:MPLS/1:IPv6, and others to be allocated) is suggested by default.

The U-SRH in the step 1 may include, but is not limited to, other flag (Flags) information parameters, including OAM packet indication information (O-Flag: OAM packet indication), indication information of the next U-SRH (N-Flag: the next U-SRH) being carried, user-defined information (U-Flag: user-defined information) being carried.

For the compatibility indicator of the U-SRH, the forwarding plane in the step 2 indicates whether the U-SRH is carried, by defining a compatibility indicator compatible with the forwarding plane, and a selection of the compatibility indicator satisfies following two requirements: on one hand, the compatibility indicator needs to be compatible with the corresponding forwarding plane, i.e., an original forwarding flow is performed for the forwarding plane which does not perceive the U-SRH; on the other hand, the packet is to be discarded by default for the forwarding plane which perceives the compatibility indicator but cannot identify the indicator, so that error forwarding is avoided. For example, a reserved label value is selected for MPLS/MPLS-TP as the compatibility indicator.

Figure 5:
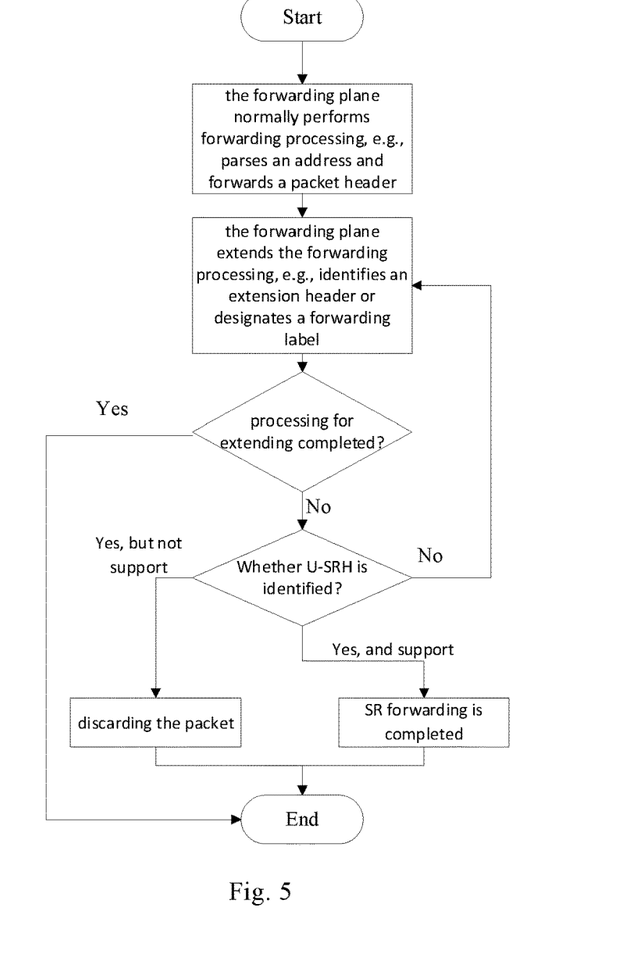
FIG. 5 is a flowchart of processing and forwarding on a forwarding plane in an embodiment of the present disclosure.

After identifying the U-SRH compatibility indicator, the forwarding plane in the step 2 performs forwarding processing according to the forwarding flow of the U-SRH, including but not limited to completing forwarding processing related to the SR label stack, where the processing flow of the forwarding plane is shown in FIG. 5, and the processing flow of each forwarding plane is described in detail below with reference to FIGS. 6 to 8.

Embodiment 6

A Unified Segment Routing Label Stack being Applied to an MPLS/MPLS-TP Forwarding Plane.

For the MPLS/MPLS-TP forwarding plane, the existing label format cannot distinguish SR label from ordinary MPLS/MPLS-TP label, i.e., whether an SR label stack is carried or not cannot be identified by the label itself unless configured or specified by a management control plane.

Figure 6:
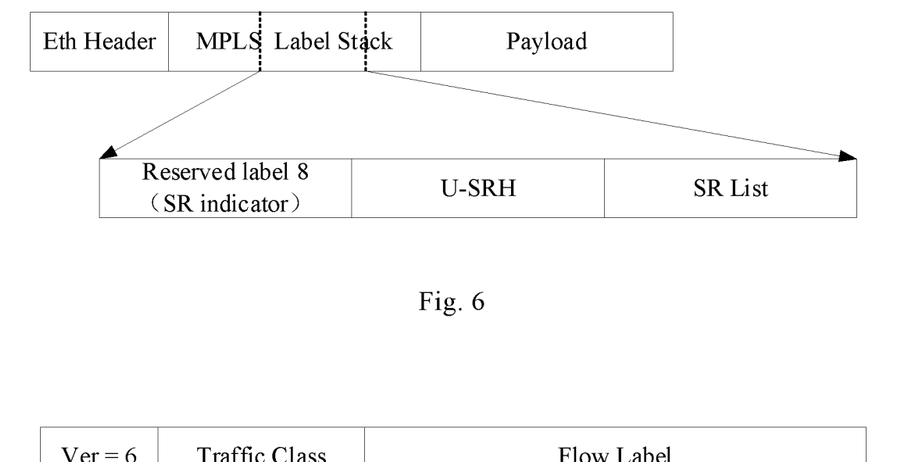
FIG. 6 is a schematic diagram illustrating a packet format of a unified SR label stack in an MPLS/MPLS-TP forwarding plane according to an embodiment of the present disclosure.

With the method of the embodiment of the present disclosure, a reserved label of MPLS/MPLS-TP (for example, a reservation label value of 8) is first allocated to indicate whether the U-SRH is carried, appropriate parameters are configured, and then an SR label stack is added, as shown in FIG. 6.

The processing of the MPLS/MPLS-TP forwarding plane is as follows.

1. the PE ingress node completes stack pushing of the U-SRH and the SR label stack and adds an SR compatibility indicator of MPLS/MPLS-TP, i.e., a reserved label 8 is pushed before the U-SRH.

2. the pure P node does not perceive the U-SRH and the SR label stack and only performs forwarding according to the original forwarding flow of MPLS/MPLS-TP.

3. the node which perceives the U-SRH, i.e., identifies the label 8 (U-SRH compatibility indicator), and supports the U-SRH performs corresponding processing of SR forwarding flow. Meanwhile, an extension processing (such as OAM) can be performed through identifying a flag of the U-SRH and the subsequent SR label.

4. the node which perceives the U-SRH but does not support the U-SRH, i.e., the node which identifies the label 8 but does not support processing of the label, discards the packet.

5. the PE egress node finishes popping the U-SRH and the SR label stack up, and recovers a payload.

Embodiment 7

A Unified Segment Routing Label Stack being Applied to an IPv6 Forwarding Plane.

For the IPv6 forwarding plane, the existing label format cannot distinguish SR label from ordinary IPv6 address, i.e., whether an SR label stack is carried or not cannot be identified by the header itself unless configured or specified by a management control plane.

Figure 7:
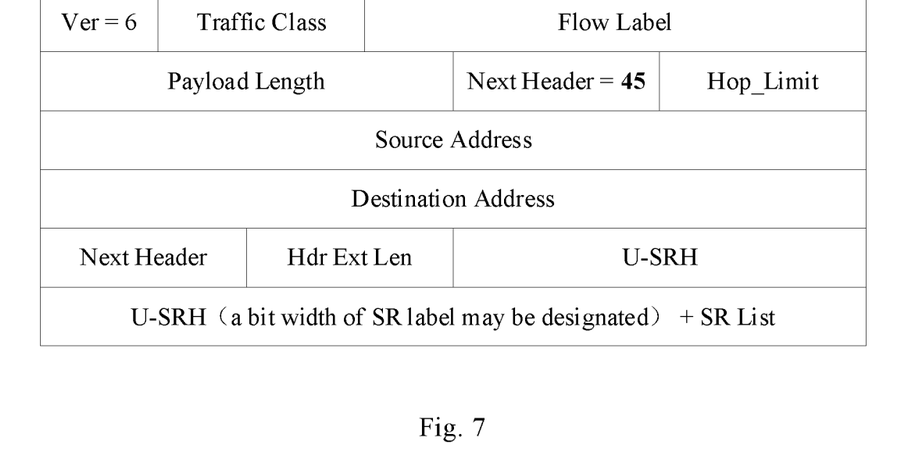
FIG. 7 is a schematic diagram illustrating a packet format of a unified SR label stack in an IPv6 forwarding plane according to an embodiment of the present disclosure.

By the method of the embodiment of the present disclosure, first, an extension header of IPv6 (for example, an extension header 45 is allocated for SR extension) is allocated to indicate whether the U-SRH is carried, appropriate parameters are configured, and then an SR label stack is added, as shown in FIG. 7. In particular, for an IPv6 address long format (128 bits), a flag may be used in the U-SRH to indicate a label address format used by the SR label stack, such as a 32 bit label, with a short format, being compatible with MPLS label may be used, thereby reducing a length of the header.

The processing of the IPv6 forwarding plane is as follows.

1. the PE ingress node completes stack pushing of the U-SRH and the SR label stack, and adds an SR compatibility indicator of IPv6, i.e., adds an IPv6 extension header before the U-SRH, and according to convention, indicates that the IPv6 extension header is compatible with SR extension header.

2. the pure P node does not perceive the U-SRH and the SR label stack and only performs forwarding according to the original forwarding flow of IPv6.

3. the node which perceives the U-SRH, i.e., identifies an extension header (U-SRH compatibility indicator) containing the U-SRH, and supports the U-SRH performs corresponding processing of SR forwarding flow. Meanwhile, an extension processing (such as OAM) can be performed through identifying a flag of the U-SRH and the subsequent SR label.

4. the node which perceives the U-SRH but does not support the U-SRH, i.e., the node which identifies the extension header but does not support processing of the label, discards the packet.

5. the PE egress node finishes popping the U-SRH and the SR label stack up, and recovers a payload.

Embodiment 8

A Unified Segment Routing Label Stack being Applied to an IPv4 Forwarding Plane.

For the IPv4 forwarding plane, the existing IPv4 header cannot distinguish whether the SR label stack is carried or not, i.e., whether an SR label stack is carried or not cannot be identified by the header itself unless configured or specified by a management control plane.

Figure 8:
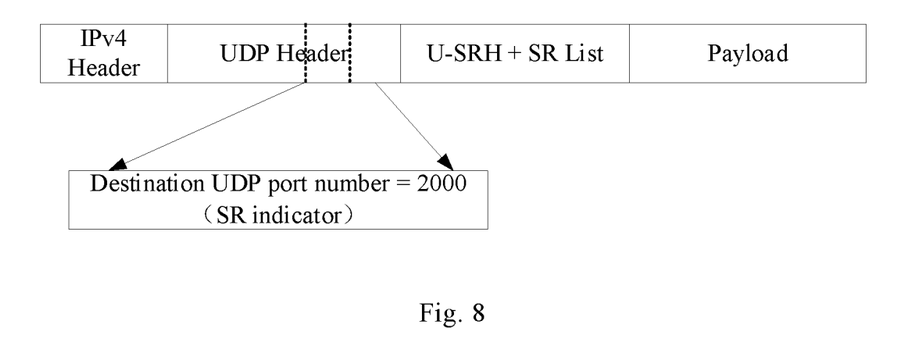
FIG. 8 is a schematic diagram illustrating a packet format of a unified SR label stack in an IPv4 forwarding plane according to an embodiment of the present disclosure.

By the method of the embodiment of the present disclosure, first, an SR compatibility indicator (for example, using a designated UDP port number 2000) of the IPv4 forwarding plane is allocated to indicate whether the U-SRH is carried, appropriate parameters are configured, and then an SR label stack is added, as shown in FIG. 8.

The processing of the IPv4 forwarding plane is as follows.

1, the PE ingress node completes stack pushing of the U-SRH and the SR label stack and adds an SR compatibility indicator of IPv4, i.e., adds a UDP encapsulation before the U-SRH and uses the compatibility indicator (the designated UDP port number, for example, 2000) according to convention.

2. The pure P node does not perceive the U-SRH and the SR label stack and only performs forwarding according to the original forwarding flow of IPv4.

3. the node which perceives the U-SRH, i.e., identifies an extension header (U-SRH compatibility indicator) containing the U-SRH, and supports the U-SRH performs corresponding processing of SR forwarding flow. Meanwhile, an extension processing (such as OAM) can be performed by identifying a flag of the U-SRH and the subsequent SR label.

4. the node which perceives the U-SRH but does not support the U-SRH, i.e., the node which identifies the extension header but does not support processing of the label, discards the packet.

5. the PE egress node finishes popping the U-SRH and the SR label stack up, and recovers a payload.

Example 9

A unified Segment Routing label stack being applied to a hybrid forwarding plane.

For a forwarding plane with MPLS/MPLS-TP and IPv6 hybrid networking, there are two scenarios.

1. the service sequentially passes through different forwarding planes, and no intersection node exists between the different forwarding planes, i.e., no node simultaneously belongs to two forwarding domains.

2. if there is an intersection node between the different forwarding planes, then an Edge Node of a mixed forwarding plane is introduced, and the Edge Node can realize intercommunication between the different forwarding planes.

For the former scenario, the forwarding planes within the MPLS/MPLS-TP and IPv6 forwarding domains are respectively the same as those in Embodiment 6 and Embodiment 7, and there is no difference.

For the latter scenario, the Edge Node needs to simultaneously complete functions of the PE node for SR in two forwarding planes, and when entering the IPv6 forwarding domain from the MPLS/MPLS-TP forwarding domain, the function of the PE egress node of the MPLS/MPLS-TP forwarding plane is completed first, and then the function of the PE ingress node of the IPv6 forwarding plane is completed.

According to the embodiments of the present disclosure, by realizing the unified SR label stack, the application of the SR technology in different forwarding planes is simplified, and uniformity of the SR encapsulation format is enhanced.

To sum up, the embodiments of the present disclosure have following technical effects.

By using the U-SRH, the embodiments of the present disclosure can conveniently realize the unified SR label stack without perceiving technologies of different forwarding planes, reduces complexity of application of the SR, and improves expandability of the SR technology.

Although the present disclosure has been described in detail above, the present disclosure is not limited thereto, and various modifications can be made by those skilled in the art in light of principles of the present disclosure. Accordingly, any modification made in accordance with the principles of the present disclosure should be understood to fall within the scope of the present disclosure.

The invention claimed is:

1. A method for processing a packet by using a unified segment routing (SR) label stack, comprising:
    allocating, according to a type of a forwarding plane, a compatibility indicator indicating that a unified segment routing header (U-SRH) is carried, for a service packet entering the forwarding plane;
    adding an SR label stack, the U-SRH and the compatibility indicator to the service packet to obtain an extended packet;
    processing and forwarding the extended packet in the forwarding plane according to the SR label stack, the U-SRH and the compatibility indicator; and
    in response to that the extended packet is forwarded to an egress of the forwarding plane, popping up the U-SRH, the SR label stack and the compatibility indicator from the extended packet, and sending the service packet out of the forwarding plane.

2. The method according to claim 1, wherein the allocating, according to the type of the forwarding plane, the compatibility indicator indicating that the U-SRH is carried, for the service packet entering the forwarding plane comprises:
    in response to that the forwarding plane is a multiprotocol label switching (MPLS) or multiprotocol label switching transport protocol (MPLS-TP) forwarding plane, allocating an MPLS or MPLS-TP reserved label indicating that the U-SRH is carried, for the service packet as the compatibility indicator;
    in response to that the forwarding plane is an IPv6 forwarding plane, allocating an IPv6 extension header indicating that the U-SRH is carried, for the service packet as the compatibility indicator;
    in response to that the forwarding plane is an IPv4 forwarding plane, allocating a user datagram protocol (UDP) port number indicating that the U-SRH is carried, for the service packet as the compatibility indicator; and
    in response to that the forwarding plane is any other forwarding plane, allocating an extension header indicating that the U-SRH is carried, for the service packet as the compatibility indicator.

3. The method according to claim 1, wherein the U-SRH contains a parameter indicating a format of the SR label stack, and the parameter includes at least one of a header version, a maximum label number and a current label number of the label stack, a maximum label depth and a current label depth, a format width of a SR label, a forwarding plane encapsulation type, other flags.

4. The method according to claim 1, wherein the adding the SR label stack, the U-SRH and the compatibility indicator to the service packet to obtain the extended packet comprises:
    pushing the SR label stack and the U-SRH into the service packet in a stack pushing mode, and pushing the compatibility indicator before the U-SRH to obtain the extended packet.

5. The method according to claim 1, wherein the processing and forwarding the extended packet in the forwarding plane according to the SR label stack, the U-SRH and the compatibility indicator comprises:
    in response to identifying that the extended packet carries the compatibility indicator and the compatibility indicator is identified as indicating a compatibility forwarding plane by parsing the extended packet, processing and forwarding the extended packet according to the U-SRH and the compatibility indicator;
    in response to that the extended packet is not identified as carrying the compatibility indicator, forwarding the extended packet according to a forwarding flow of the forwarding plane; and
    in response to that the compatibility indicator is not identified as indicating the compatibility forwarding plane, discarding the extended packet.

6. A device for processing a packet by using a unified segment routing (SR) label stack, comprising:
    an allocating module configured to allocate, according to a type of a forwarding plane, a compatibility indicator indicating that a unified segment routing header (U-SRH) is carried, for a service packet entering the forwarding plane;
    a stack pushing module configured to add an SR label stack, the U-SRH and the compatibility indicator to the service packet to obtain an extended packet; and
    a forwarding module configured to process and forward the extended packet in the forwarding plane according to the SR label stack, the U-SRH and the compatibility indicator, and in response to that the extended packet is forwarded to an egress of the forwarding plane, pop up the U-SRH, the SR label stack and the compatibility indicator from the extended packet, and send the service packet out of the forwarding plane.

7. A device for processing a packet by using a unified segment routing (SR) label stack, comprising: a processor and a memory coupled to the processor, the memory stores a program, capable of being executed by the processor, for processing the packet by using the unified SR label stack, and the program is to be executed by the processor to implement the method according to claim 1.

8. A system for processing a packet by using a unified segment routing (SR) label stack, comprising:
    an ingress node configured to allocate, according to a type of a forwarding plane, a compatibility indicator indicating that a unified segment routing header (U-SRH) is carried, for a service packet entering the forwarding plane, and add an SR label stack, the U-SRH and the compatibility indicator to the service packet to obtain an extended packet;
    a forwarding node configured to determine that the extended packet carries the U-SRH according to the compatibility indicator carried by the extended packet, and process and forward the extended packet according to the U-SRH and the SR label stack; and an egress node configured to pop up the U-SRH, the SR label stack and the compatibility indicator from the extended packet, and send the service packet out of the forwarding plane.

9. A non-transitory computer readable medium, in which a program for processing a packet by using a unified segment routing (SR) label stack is stored, wherein the program is to be executed by a processor to implement the method according to claim 1.

10. A method for processing a packet by using a unified segment routing (SR) label stack, comprising:

allocating, according to a type of a forwarding plane, a compatibility indicator indicating that a unified segment routing header (U-SRH) is carried, for a service packet entering the forwarding plane;

adding an SR label stack, the U-SRH and the compatibility indicator to the service packet to obtain an extended packet;

processing and forwarding the extended packet in the forwarding plane according to the SR label stack, the U-SRH and the compatibility indicator, wherein the processing and forwarding the extended packet in the forwarding plane according to the SR label stack, the U-SRH and the compatibility indicator comprises:

in response to identifying that the extended packet carries the compatibility indicator and the compatibility indicator is identified as indicating a compatibility forwarding plane by parsing the extended packet, processing and forwarding the extended packet according to the U-SRH and the compatibility indicator;

in response to that the extended packet is not identified as carrying the compatibility indicator, forwarding the extended packet according to a forwarding flow of the forwarding plane; and in response to that the compatibility indicator is not identified as indicating the compatibility forwarding plane, discarding the extended packet.

* * * * *